United States Patent
Chauhan et al.

(10) Patent No.: US 12,332,771 B2
(45) Date of Patent: Jun. 17, 2025

(54) SYSTEM FOR AUTOMATED INTELLIGENT TESTING OF DESKTOP APPLICATIONS THROUGH MACHINE LEARNING

(71) Applicant: BANK OF AMERICA CORPORATION, Charlotte, NC (US)

(72) Inventors: Dilip Singh Chauhan, South West Delhi (IN); Richa Kumari, Bihar (IN); Gogulsundhar Palanivel, Chennai (IN); T Vignesh, Chennai (IN)

(73) Assignee: BANK OF AMERICA CORPORATION, Charlotte, NC (US)

( * ) Notice: Subject to any disclaimer, the term of this patent is extended or adjusted under 35 U.S.C. 154(b) by 183 days.

(21) Appl. No.: 18/215,369

(22) Filed: Jun. 28, 2023

(65) Prior Publication Data

US 2025/0004930 A1    Jan. 2, 2025

(51) Int. Cl.
     *G06F 11/36*      (2025.01)
     *G06F 11/3668*      (2025.01)

(52) U.S. Cl.
     CPC ...... *G06F 11/3688* (2013.01); *G06F 11/3692* (2013.01)

(58) Field of Classification Search
None
See application file for complete search history.

(56) References Cited

U.S. PATENT DOCUMENTS

| | | | |
|---|---|---|---|
| 8,370,362 B2 | 2/2013 | Szabo | |
| 8,966,447 B2 * | 2/2015 | Hoke | G06F 11/3672 717/124 |
| 10,007,513 B2 | 6/2018 | Malladi | |
| 10,268,571 B2 * | 4/2019 | Kulkarni | H04L 67/02 |
| 10,649,988 B1 | 5/2020 | Gold | |
| 10,726,359 B1 | 7/2020 | Drouin | |
| 10,769,056 B2 | 9/2020 | Maliani | |
| 10,943,036 B2 | 3/2021 | Rezgui | |
| 11,048,619 B2 | 6/2021 | Arbon | |
| 11,164,045 B2 | 11/2021 | Paik | |
| 11,263,003 B1 * | 3/2022 | Gan | G06F 16/219 |

(Continued)

FOREIGN PATENT DOCUMENTS

| CN | 101621418 A | 1/2010 |
|---|---|---|

*Primary Examiner* — Philip Wang
*Assistant Examiner* — Rongfa P Wang
(74) *Attorney, Agent, or Firm* — Moore & Van Allen PLLC; Nicholas C. Russell

(57) ABSTRACT

A system is provided for automated intelligent testing of desktop applications through machine learning. In particular, the system may combine process automation technologies with artificial intelligence/machine learning capabilities to perform end-to-end testing of both simple and complex applications. The system may comprise a test automation component that may produce real runtime outputs of the testing process, and an artificial intelligence engine that may produce predicted outputs based on historical data. The system may analyze both the real runtime outputs with the predicted outputs and determine a delta between the real runtime outputs and the predicted outputs. The results of the analysis may be backpropagated to the artificial intelligence engine to iteratively improve the machine learning model over time. In this way, the system may provide an efficient way to test computer applications.

20 Claims, 5 Drawing Sheets

(56) References Cited

U.S. PATENT DOCUMENTS

| | | |
|---|---|---|
| 11,366,456 B2 | 6/2022 | Cella |
| 11,416,384 B1* | 8/2022 | Selph .................. G06F 16/2246 |
| 11,422,871 B1* | 8/2022 | Mounirou ............. G06F 16/113 |
| 11,475,326 B2 | 10/2022 | Cmielowski |
| 11,556,862 B2 | 1/2023 | Polleri |
| 11,562,267 B2 | 1/2023 | Polleri |
| 11,645,139 B2 | 5/2023 | Cser |
| 11,687,800 B2 | 6/2023 | Bonutti |
| 11,748,239 B1* | 9/2023 | Gouda ................... G06N 20/00 706/11 |
| 2018/0247191 A1 | 8/2018 | Katz |
| 2019/0324439 A1 | 10/2019 | Cella |
| 2020/0089211 A1 | 3/2020 | Cella |
| 2020/0159498 A1 | 5/2020 | Bodin |
| 2021/0157710 A1* | 5/2021 | Alexander .......... G06F 11/3476 |
| 2021/0192412 A1 | 6/2021 | Krishnaswamy |
| 2022/0083458 A1* | 3/2022 | Shang .................... G06V 20/44 |
| 2022/0173959 A1* | 6/2022 | Erkan ................. H04L 41/5019 |
| 2023/0185700 A1* | 6/2023 | Wong ................. G06F 11/3688 714/38.1 |
| 2025/0053440 A1* | 2/2025 | Ramakrishnan ...... G06F 9/4881 |
| 2025/0053982 A1* | 2/2025 | Neighbour ............ H04W 12/12 |

\* cited by examiner

SYSTEM FOR AUTOMATED INTELLIGENT TESTING OF DESKTOP APPLICATIONS THROUGH MACHINE LEARNING

TECHNOLOGICAL FIELD

Example embodiments of the present disclosure relate to a system for automated intelligent testing of desktop applications through machine learning.

BACKGROUND

There is a need for a way to efficiently perform application testing.

BRIEF SUMMARY

The following presents a simplified summary of one or more embodiments of the present invention, in order to provide a basic understanding of such embodiments. This summary is not an extensive overview of all contemplated embodiments and is intended to neither identify key or critical elements of all embodiments nor delineate the scope of any or all embodiments. Its sole purpose is to present some concepts of one or more embodiments of the present invention in a simplified form as a prelude to the more detailed description that is presented later.

A system is provided for automated intelligent testing of desktop applications through machine learning. In particular, the system may combine process automation technologies with artificial intelligence/machine learning capabilities to perform end-to-end testing of both simple and complex applications. The system may comprise a test automation component that may produce real runtime outputs of the testing process, and an artificial intelligence engine that may produce predicted outputs based on historical data. The system may analyze both the real runtime outputs with the predicted outputs and determine a delta between the real runtime outputs and the predicted outputs. The results of the analysis may be backpropagated to the artificial intelligence engine to iteratively improve the machine learning model over time. In this way, the system may provide an efficient way to test computer applications.

Accordingly, embodiments of the present disclosure provide a system for automated intelligent testing of desktop applications through machine learning, the system comprising a processing device; a non-transitory storage device containing instructions when executed by the processing device, causes the processing device to perform the steps of: initiating a testing process for a target computing application by receiving, using a process automation module, input testing data from one or more upstream computing systems; executing a first function of the target application based on the input testing data to produce a real-time data output; receiving, from the user computing device, an event data record comprising event-related data associated with the resource; generating, using a predicted data output generator, a predicted data output based on historical data associated with the first function; computing, using a decisioning engine, a delta value between the real-time data output and the predicted data output; determining whether the delta value is within a threshold associated with the first function; and backpropagating results of the testing process to the predicted data output generator.

In some embodiments, determining whether the delta value is within a threshold associated with the first function comprises determining that the delta value is within the threshold associated with the first function; and based on determining that the delta value is within the threshold associated with the first function, determining that the testing process has succeeded with respect to the first function.

In some embodiments, backpropagating the results of the testing process comprises generating a data record indicating that the testing process has succeeded, wherein the data record comprises the input testing data, the real-time data output, the predicted data output, the delta value between the real-time data output and the predicted data output, and a timestamp of completion of the testing process.

In some embodiments, determining whether the delta value is within a threshold associated with the first function comprises determining that the delta value is outside of the threshold associated with the first function; and based on determining that the delta value is outside of the threshold associated with the first function, determining that the testing process has failed with respect to the first function.

In some embodiments, backpropagating the results of the testing process comprises generating a data record indicating that the testing process has failed, wherein the data record comprises the input testing data, the real-time data output, the predicted data output, the delta value between the real-time data output and the predicted data output, and a timestamp of completion of the testing process.

In some embodiments, the threshold associated with the first function is determined based on historical data regarding historical input testing data values and historical data output values.

In some embodiments, the predicted data output generator uses a machine-learning model to generate the predicted data output.

Embodiments of the present disclosure also provide a computer program product for automated intelligent testing of desktop applications through machine learning, the computer program product comprising a non-transitory computer-readable medium comprising code causing an apparatus to perform the steps of: initiating a testing process for a target computing application by receiving, using a process automation module, input testing data from one or more upstream computing systems; executing a first function of the target application based on the input testing data to produce a real-time data output; receiving, from the user computing device, an event data record comprising event-related data associated with the resource; generating, using a predicted data output generator, a predicted data output based on historical data associated with the first function; computing, using a decisioning engine, a delta value between the real-time data output and the predicted data output; determining whether the delta value is within a threshold associated with the first function; and backpropagating results of the testing process to the predicted data output generator.

In some embodiments, determining whether the delta value is within a threshold associated with the first function comprises determining that the delta value is within the threshold associated with the first function; and based on determining that the delta value is within the threshold associated with the first function, determining that the testing process has succeeded with respect to the first function.

In some embodiments, backpropagating the results of the testing process comprises generating a data record indicating that the testing process has succeeded, wherein the data record comprises the input testing data, the real-time data output, the predicted data output, the delta value between the real-time data output and the predicted data output, and a timestamp of completion of the testing process.

In some embodiments, determining whether the delta value is within a threshold associated with the first function comprises: determining that the delta value is outside of the threshold associated with the first function; and based on determining that the delta value is outside of the threshold associated with the first function, determining that the testing process has failed with respect to the first function.

In some embodiments, backpropagating the results of the testing process comprises generating a data record indicating that the testing process has failed, wherein the data record comprises the input testing data, the real-time data output, the predicted data output, the delta value between the real-time data output and the predicted data output, and a timestamp of completion of the testing process.

In some embodiments, the threshold associated with the first function is determined based on historical data regarding historical input testing data values and historical data output values.

Embodiments of the present disclosure also provide a computer-implemented method for automated intelligent testing of desktop applications through machine learning, the computer-implemented method comprising: initiating a testing process for a target computing application by receiving, using a process automation module, input testing data from one or more upstream computing systems; executing a first function of the target application based on the input testing data to produce a real-time data output; receiving, from the user computing device, an event data record comprising event-related data associated with the resource; generating, using a predicted data output generator, a predicted data output based on historical data associated with the first function; computing, using a decisioning engine, a delta value between the real-time data output and the predicted data output; determining whether the delta value is within a threshold associated with the first function; and backpropagating results of the testing process to the predicted data output generator.

In some embodiments, determining whether the delta value is within a threshold associated with the first function comprises: determining that the delta value is within the threshold associated with the first function; and based on determining that the delta value is within the threshold associated with the first function, determining that the testing process has succeeded with respect to the first function.

In some embodiments, backpropagating the results of the testing process comprises generating a data record indicating that the testing process has succeeded, wherein the data record comprises the input testing data, the real-time data output, the predicted data output, the delta value between the real-time data output and the predicted data output, and a timestamp of completion of the testing process.

In some embodiments, determining whether the delta value is within a threshold associated with the first function comprises determining that the delta value is outside of the threshold associated with the first function; and based on determining that the delta value is outside of the threshold associated with the first function, determining that the testing process has failed with respect to the first function.

In some embodiments, backpropagating the results of the testing process comprises generating a data record indicating that the testing process has failed, wherein the data record comprises the input testing data, the real-time data output, the predicted data output, the delta value between the real-time data output and the predicted data output, and a timestamp of completion of the testing process.

In some embodiments, the threshold associated with the first function is determined based on historical data regarding historical input testing data values and historical data output values.

In some embodiments, the predicted data output generator uses a machine-learning model to generate the predicted data output.

The above summary is provided merely for purposes of summarizing some example embodiments to provide a basic understanding of some aspects of the present disclosure. Accordingly, it will be appreciated that the above-described embodiments are merely examples and should not be construed to narrow the scope or spirit of the disclosure in any way. It will be appreciated that the scope of the present disclosure encompasses many potential embodiments in addition to those here summarized, some of which will be further described below.

BRIEF DESCRIPTION OF THE DRAWINGS

Having thus described embodiments of the disclosure in general terms, reference will now be made the accompanying drawings. The components illustrated in the figures may or may not be present in certain embodiments described herein. Some embodiments may include fewer (or more) components than those shown in the figures.

Figure 1A:
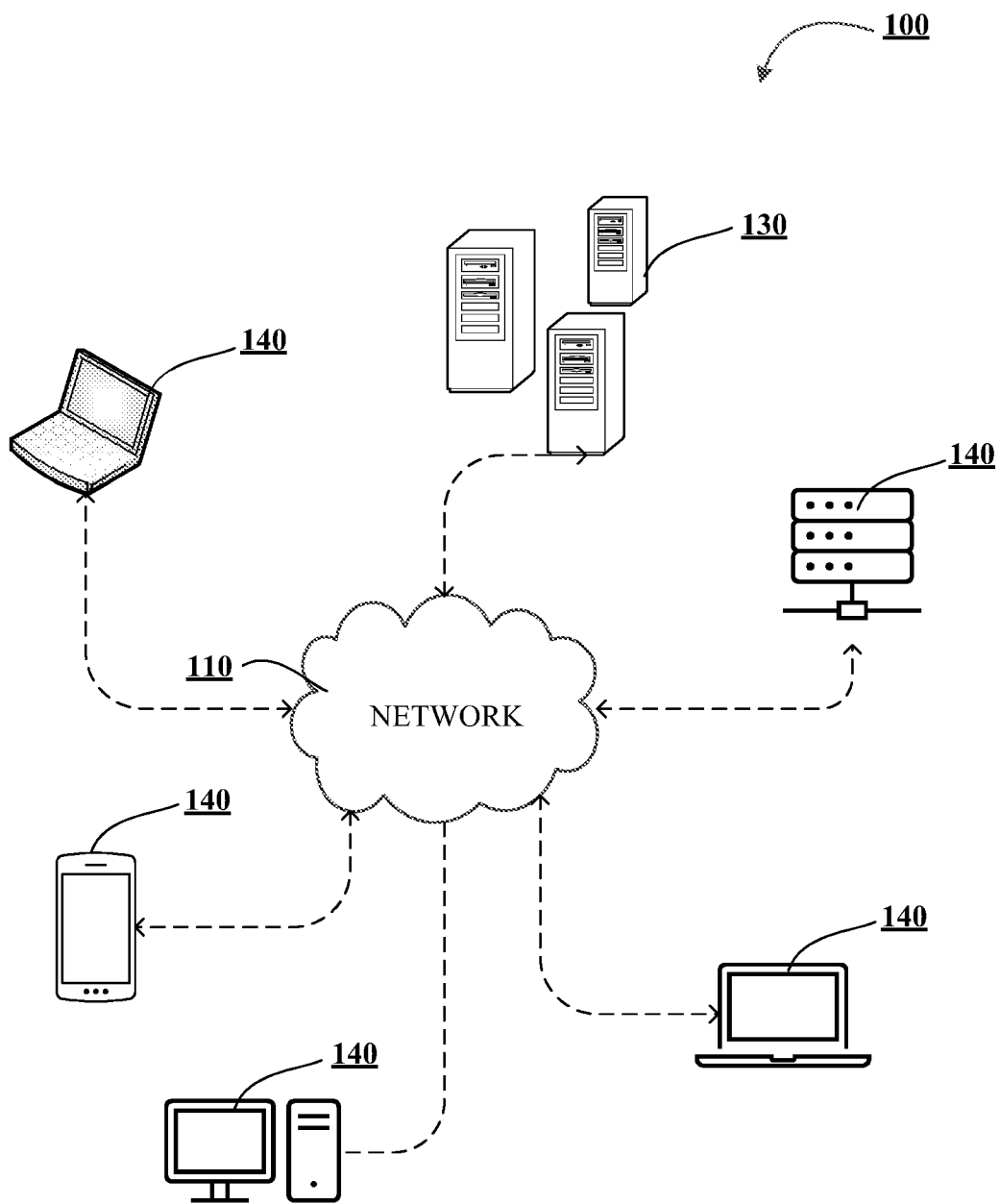
Figure 1B:
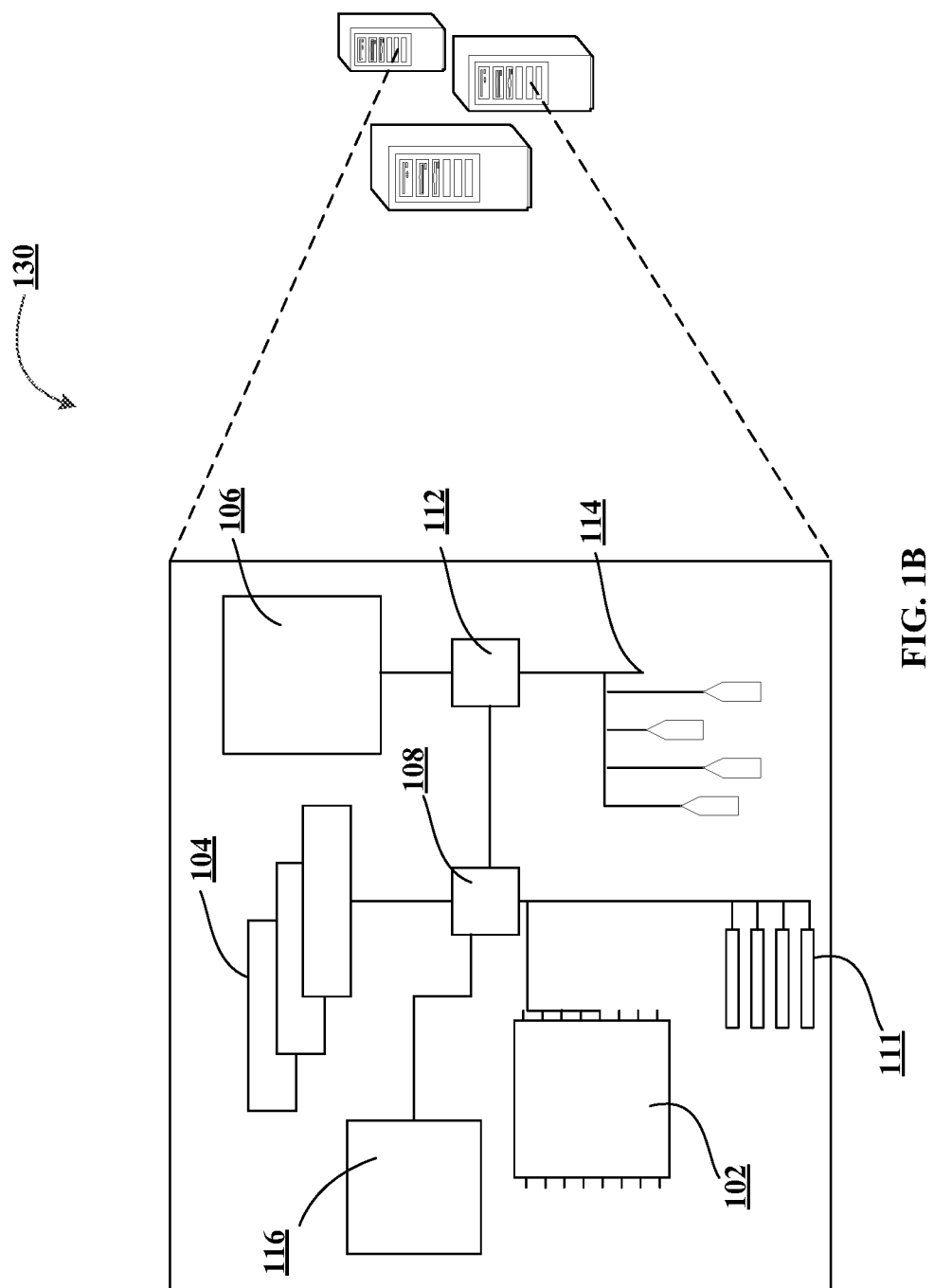
Figure 1C:
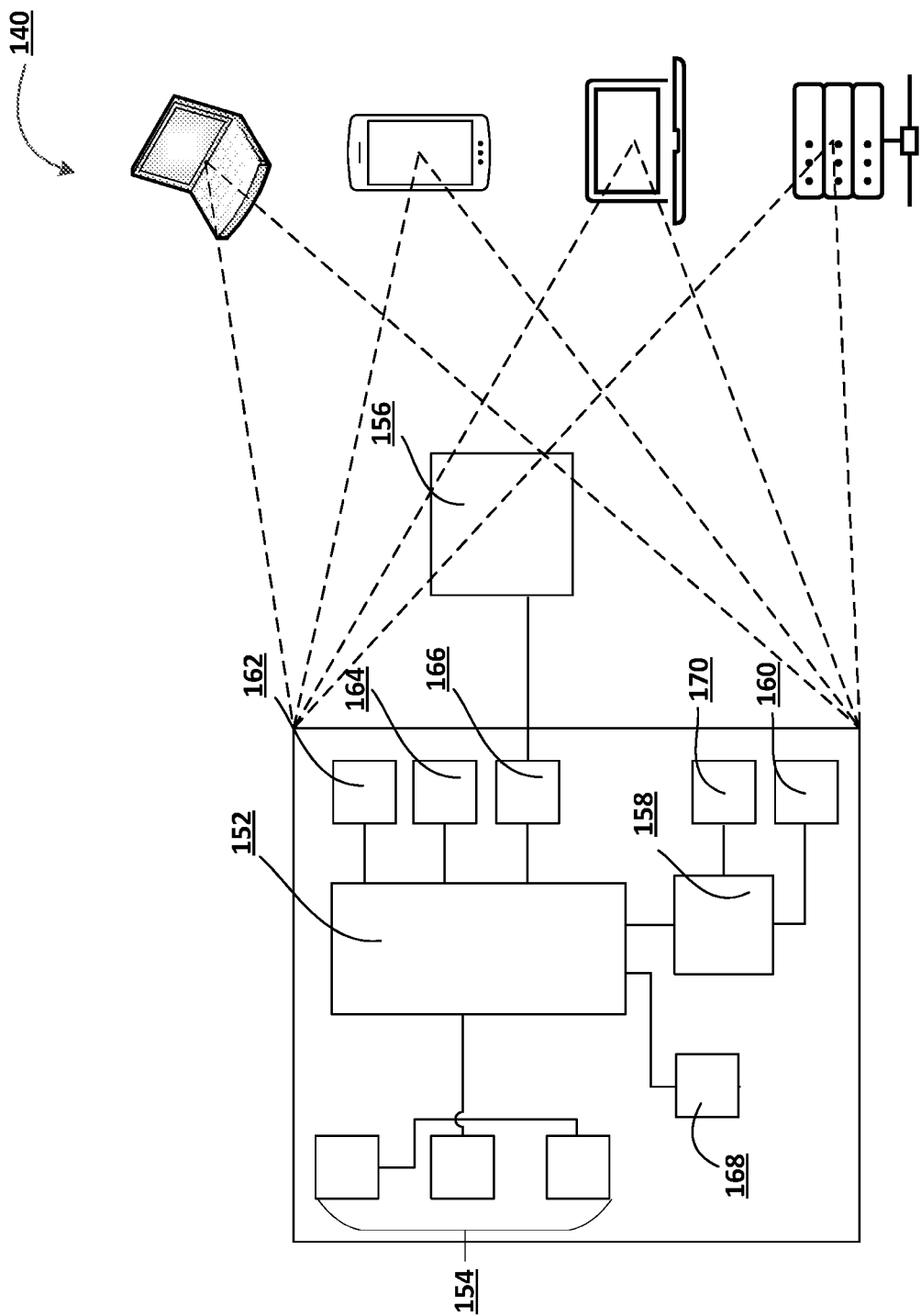
Figure 2:
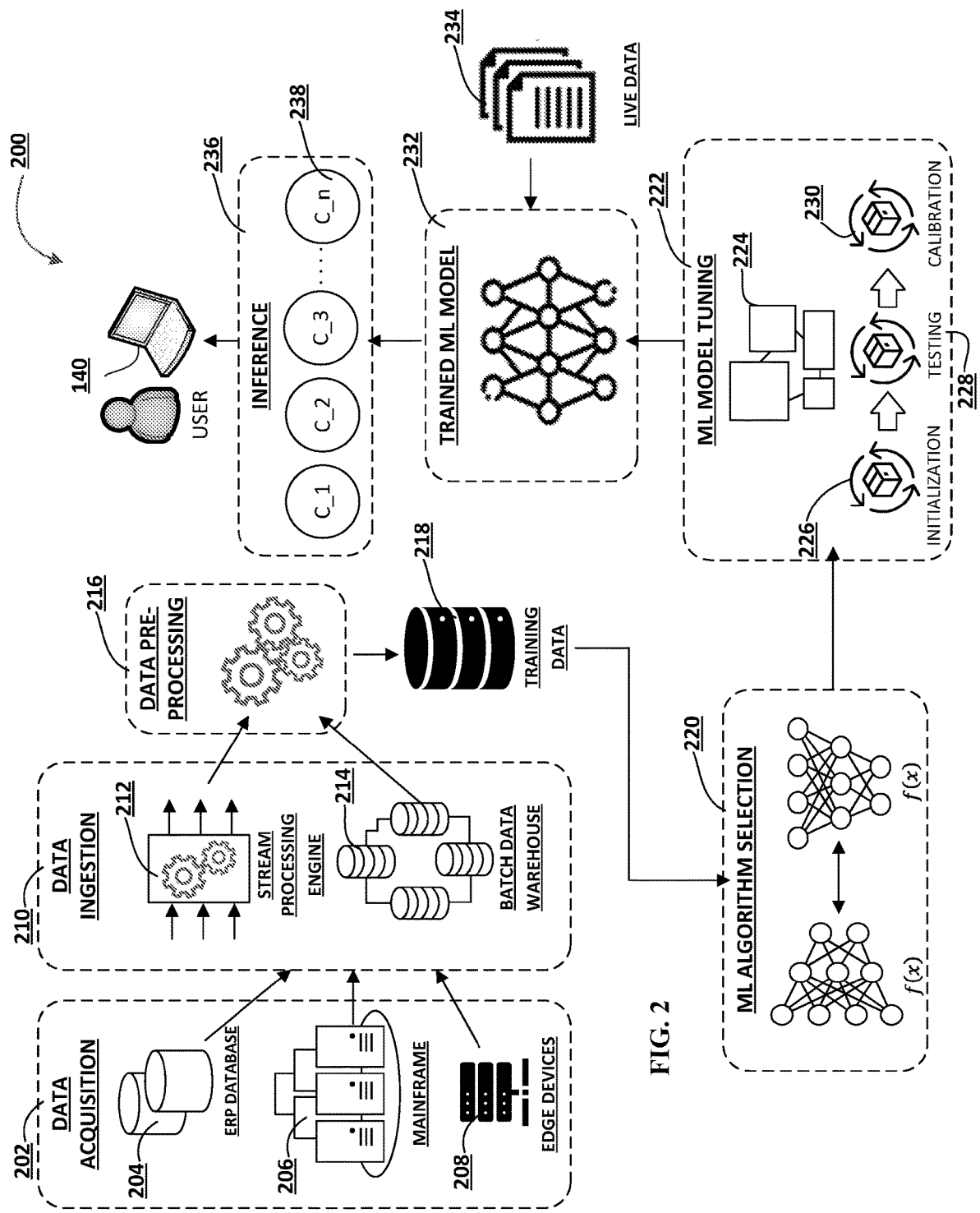
Figure 3:
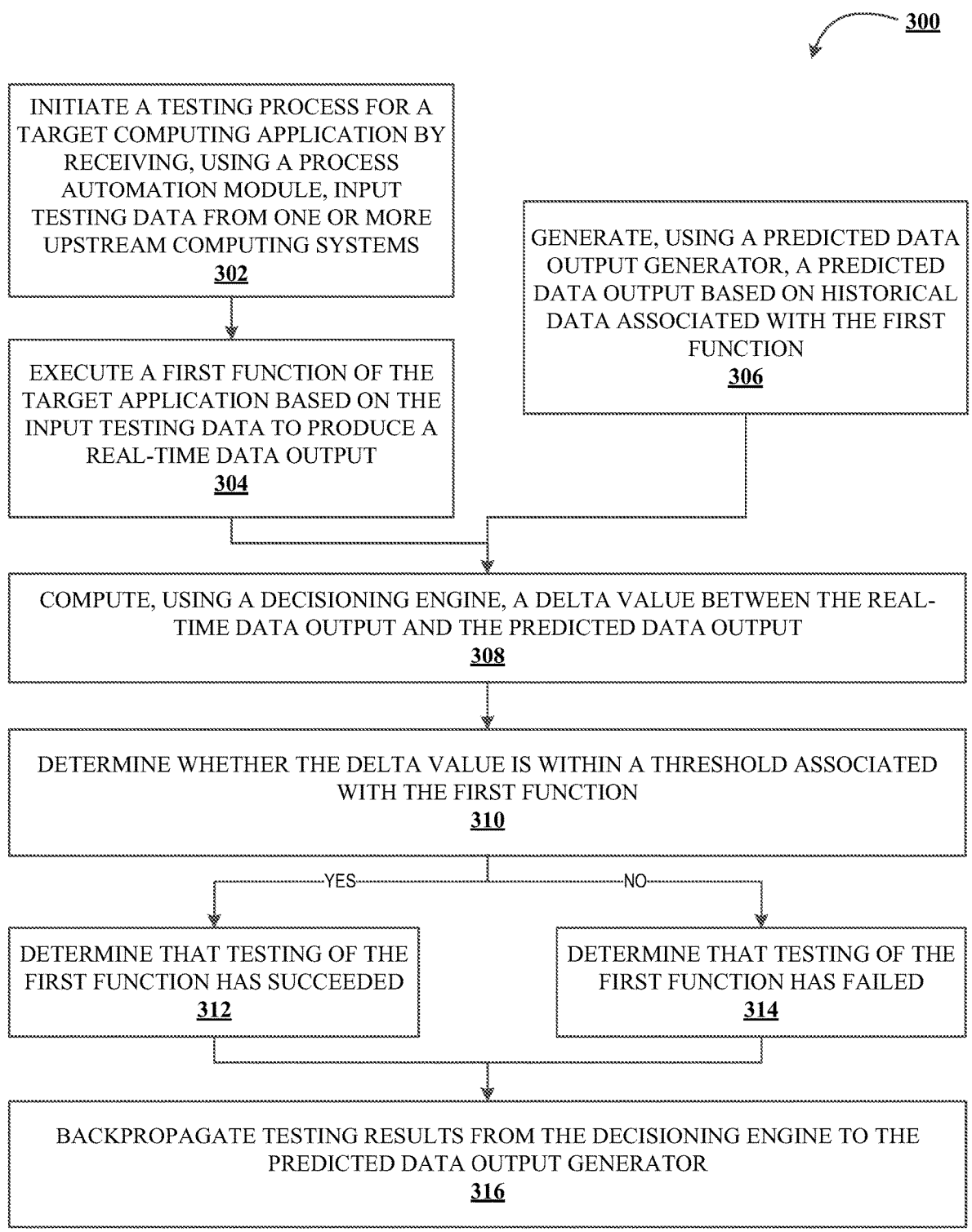

FIGS. 1A-1C illustrates technical components of an exemplary distributed computing environment for automated intelligent testing of desktop applications through machine learning, in accordance with an embodiment of the disclosure;

FIG. 2 illustrates an exemplary machine learning ("ML") subsystem architecture, in accordance with an embodiment of the disclosure; and FIG. 3 illustrates a method for automated intelligent testing of desktop applications through machine learning, in accordance with an embodiment of the disclosure.

DETAILED DESCRIPTION

Embodiments of the present disclosure will now be described more fully hereinafter with reference to the accompanying drawings, in which some, but not all, embodiments of the disclosure are shown. Indeed, the disclosure may be embodied in many different forms and should not be construed as limited to the embodiments set forth herein; rather, these embodiments are provided so that this disclosure will satisfy applicable legal requirements. Where possible, any terms expressed in the singular form herein are meant to also include the plural form and vice versa, unless explicitly stated otherwise. Also, as used herein, the term "a" and/or "an" shall mean "one or more," even though the phrase "one or more" is also used herein. Furthermore, when it is said herein that something is "based on" something else, it may be based on one or more other things as well. In other words, unless expressly indicated otherwise, as used herein "based on" means "based at least in part on" or "based at least partially on." Like numbers refer to like elements throughout.

As used herein, an "entity" may be any institution employing information technology resources and particularly technology infrastructure configured for processing large amounts of data. Typically, these data can be related to the people who work for the organization, its products or services, the customers or any other aspect of the operations of the organization. As such, the entity may be any institution, group, association, financial institution, establishment, company, union, authority or the like, employing information technology resources for processing large amounts of data.

As described herein, a "user" may be an individual associated with an entity. As such, in some embodiments, the user may be an individual having past relationships, current relationships or potential future relationships with an entity. In some embodiments, the user may be an employee (e.g., an associate, a project manager, an IT specialist, a manager, an administrator, an internal operations analyst, or the like) of the entity or enterprises affiliated with the entity.

As used herein, a "user interface" may be a point of human-computer interaction and communication in a device that allows a user to input information, such as commands or data, into a device, or that allows the device to output information to the user. For example, the user interface includes a graphical user interface (GUI) or an interface to input computer-executable instructions that direct a processor to carry out specific functions. The user interface typically employs certain input and output devices such as a display, mouse, keyboard, button, touchpad, touch screen, microphone, speaker, LED, light, joystick, switch, buzzer, bell, and/or other user input/output device for communicating with one or more users.

As used herein, "authentication credentials" may be any information that can be used to identify of a user. For example, a system may prompt a user to enter authentication information such as a username, a password, a personal identification number (PIN), a passcode, unique characteristic information (e.g., iris recognition, retina scans, fingerprints, finger veins, palm veins, palm prints, digital bone anatomy/structure and positioning (distal phalanges, intermediate phalanges, proximal phalanges, and the like), an answer to a security question, a unique intrinsic user activity, such as making a predefined motion with a user device. This authentication information may be used to authenticate the identity of the user (e.g., determine that the authentication information is associated with the account) and determine that the user has authority to access an account or system. In some embodiments, the system may be owned or operated by an entity. In such embodiments, the entity may employ additional computer systems, such as authentication servers, to validate and certify resources inputted by the plurality of users within the system. The system may further use its authentication servers to certify the identity of users of the system, such that other users may verify the identity of the certified users. In some embodiments, the entity may certify the identity of the users. Furthermore, authentication information or permission may be assigned to or required from a user, application, computing node, computing cluster, or the like to access stored data within at least a portion of the system.

It should also be understood that "operatively coupled," as used herein, means that the components may be formed integrally with each other, or may be formed separately and coupled together. Furthermore, "operatively coupled" means that the components may be formed directly to each other, or to each other with one or more components located between the components that are operatively coupled together. Furthermore, "operatively coupled" may mean that the components are detachable from each other, or that they are permanently coupled together. Furthermore, operatively coupled components may mean that the components retain at least some freedom of movement in one or more directions or may be rotated about an axis (i.e., rotationally coupled, pivotally coupled). Furthermore, "operatively coupled" may mean that components may be electronically connected and/or in fluid communication with one another.

As used herein, an "interaction" may refer to any communication between one or more users, one or more entities or institutions, one or more devices, nodes, clusters, or systems within the distributed computing environment described herein. For example, an interaction may refer to a transfer of data between devices, an accessing of stored data by one or more nodes of a computing cluster, a transmission of a requested task, or the like.

It should be understood that the word "exemplary" is used herein to mean "serving as an example, instance, or illustration." Any implementation described herein as "exemplary" is not necessarily to be construed as advantageous over other implementations.

As used herein, "determining" may encompass a variety of actions. For example, "determining" may include calculating, computing, processing, deriving, investigating, ascertaining, and/or the like. Furthermore, "determining" may also include receiving (e.g., receiving information), accessing (e.g., accessing data in a memory), and/or the like. Also, "determining" may include resolving, selecting, choosing, calculating, establishing, and/or the like. Determining may also include ascertaining that a parameter matches a predetermined criterion, including that a threshold has been met, passed, exceeded, and so on.

As used herein, "resource" may refer to a tangible or intangible object that may be used, consumed, maintained, acquired, exchanged, and/or the like by a system, entity, or user to accomplish certain objectives. Accordingly, in some embodiments, the resources may include computing resources such as processing power, memory space, network bandwidth, bus speeds, storage space, electricity, and/or the like. In other embodiments, the resources may include objects such as electronic data files or values, authentication keys (e.g., cryptographic keys), document files, funds, digital currencies, and/or the like. In yet other embodiments, the resources may include real-world goods or commodities that may be acquired and/or exchanged by a user.

"Process automation," "robotic process automation," or "RPA" as used herein may refer to one or more software-based tools for automating workflows and/or tasks within an application. In some embodiments, process automation tools may interact with an application (e.g., an application in a testing or production environment) through the graphical user interface ("GUI") layer of the application. Accordingly, the workflows and/or tasks (e.g., tasks related to application testing) may be carried out by one or more bots (which may also be referred to herein as "process automation bots") that may interact with an application in the same manner as a user would (e.g., through user inputs such as key presses and/or mouse clicks on interface elements within the GUI of the application).

Performing testing of computing applications (e.g., desktop or mobile based software applications), particularly those applications that are complex in functionality (e.g., an application with multiple layers, popups, and/or screens in a pathway for a particular function), poses a number of technological challenges. In this regard, performing complex operations within an application that may require numerous sequential inputs and/or have multiple function pathways within the application may prove to be difficult to automate, requiring one or more workarounds and/or leading to high execution times. Furthermore, real-time changes in input data for a testing application may cause detected discrepancies in expected output to be flagged as false failures of the application during the testing process.

Accordingly, there is a need for a more efficient and intelligent way to perform testing of computer applications.

To address the above concerns among others, the system described herein provides a way to perform automated intelligent testing of computing applications through machine learning. The system may comprise a process automation module that may ingest various types of data inputs for testing a target computing application (e.g., a desktop-based application). In this regard, the process automation module may comprise one or more process automation bots that may use the data inputs (which may be ingested from upstream data files from various types of files, such as database files, spreadsheet files, document files, and/or the like) to perform one or more functions within the application based on the data inputs. For instance, the target application may be configured to receive the data inputs and perform a series of computations on the data inputs to produce a data output. The output of the target application, which may be produced in real time during the testing process, may be referred to as "real-time data output." In an exemplary embodiment, the system may be used to test the data output of a first function of the target application based on a certain data input.

In parallel to the foregoing processes, the system may comprise an artificial intelligence ("AI") based predicted data output generator (which may be referred to herein as "the generator") that may ingest baseline/historical data regarding data inputs and resulting data outputs based on particular functions of the target application. To this end, the historical data may comprise, for instance, data regarding what outputs were produced by a particular function of the target application based on a specified input. Based on the historical data, the generator may produce a machine-learning based predicted data output of executing the functions being tested during the testing process (e.g., the first function, continuing the above example).

The real-time data output and the predicted data output may be input into an AI-based decisioning engine that may compare the delta between the real-time data output and the predicted data output for each instance of testing of a function of an application. If the delta falls below a defined threshold associated with the function being tested, the decisioning engine may determine that the delta falls within expected parameters and subsequently mark the data as a false failure (or determine that the delta does not constitute a failure of the function of the application). The threshold for each function may in turn be determined based on the historical data associated with the particular function. In an exemplary embodiment, the system may be used to test a function of an application that receives an input value, performs various computations on the input value, and returns an output value. Continuing the example, the real-time data output for a particular input value (e.g., 3.12) as computed during the testing process may be 8.33. The system may, in parallel, generate a predicted data output of the function to be 8.56. The system may compute the delta between the real-time data output and the predicted data output (e.g., −0.23) and determine whether the delta falls below the threshold associated with the function (or "function threshold"). The function threshold (which may be, for example, plus or minus 0.5) may be based on historical data (which may include quality control or "QC" data) of prior computed values based on the function being tested. Accordingly, upon determining that the real-time data output falls within the threshold, the system may determine the testing of the function to be successful. On the other hand, if the real-time data output falls outside of the threshold, the system may determine that the testing of the function has failed.

In some embodiments, the decisioning engine may record all of the instances of the comparisons computed by the decisioning engine (whether the testing results succeeded or failed) into the historical data, which may then be back-propagated to the generator. The historical data may then be used to further train the machine learning models of the generator. In this way, the system may iteratively improve the accuracy of the predicted data outputs produced by the generator (e.g., predicted data outputs that more closely match the real-time data outputs). In turn, the increased accuracy of the predicated data outputs may reduce the instances of false failures detected during the testing process.

An exemplary embodiment is described below for illustrative purposes only and should not be construed as restricting the scope of the disclosure provided herein. In one embodiment, a user such as an application developer or tester may use the system to test the functions (e.g., a first function, second function, and/or the like) of a target application (e.g., a financial computing application). For instance, the first function may be a function that computes growth of a resource (e.g., a certain amount of funds in a designated currency) over a set period of time. In such a scenario, the testing process may be initiated by the one or more bots of the process automation module, which may pull current upstream input data (e.g., various resource amounts) and use the input data to test the first function of the target application. Accordingly, the bots may traverse the one or more layers (e.g., screens, windows, and/or the like) and perform the actions (e.g., key strokes, mouse or touch inputs of interface elements, and/or the like) to execute the first function based on the input data. The first function of the target application may then produce real-time data outputs for each value of input data. The inputting of a single input value (e.g., 10) and producing a corresponding output value (e.g., 33) may be referred to herein as a "testing instance" or "instance."

In parallel, the predicted data output generator may, based on its machine learning models (e.g., a generative adversarial network or "GAN" model), generate a predicted data output comprising predicted output values for each of the input data values. The machine learning model may be trained using QC data for the first function, which includes real instances of computed output values for the first function for given input values. That said, real-time fluctuations in current data (e.g., changes in interest rates) may cause the real-time data outputs to be mismatched with the predicted data outputs, even when the first function is properly functioning.

Accordingly, in order to reduce the number of false failures, the decisioning engine may compute the delta between the real-time data outputs and the predicted data outputs for each testing instance and compare the delta against a function threshold associated with the first function. If the delta falls below the function threshold, the system may determine that the particular testing instance has succeeded (e.g., the delta is a false failure). However, if the delta is above the function threshold, the system may determine that the testing instance has failed and subsequently flag the first function as potentially containing a defect (e.g., a software bug).

The system as described herein provides a number of technological benefits over conventional application testing systems. In particular, by incorporating process automation, the system may ensure end-to-end testing automation of even complex functions within complex applications. Furthermore, by using a machine-learning model that learns through backpropagation of computations by the decisioning engine, the system may ensure that predicted data outputs match the real-time computed data outputs as closely as possible.

FIGS. 1A-1C illustrate technical components of an exemplary distributed computing environment 100 for the system for automated intelligent testing of desktop applications through machine learning. As shown in FIG. 1A, the distributed computing environment 100 contemplated herein may include a system 130, an end-point device(s) 140, and a network 110 over which the system 130 and end-point device(s) 140 communicate therebetween. FIG. 1A illustrates only one example of an embodiment of the distributed computing environment 100, and it will be appreciated that in other embodiments one or more of the systems, devices, and/or servers may be combined into a single system, device, or server, or be made up of multiple systems, devices, or servers. For instance, the functions of the system 130 and the endpoint devices 140 may be performed on the same device (e.g., the endpoint device 140). Also, the distributed computing environment 100 may include multiple systems, same or similar to system 130, with each system providing portions of the necessary operations (e.g., as a server bank, a group of blade servers, or a multi-processor system).

In some embodiments, the system 130 and the end-point device(s) 140 may have a client-server relationship in which the end-point device(s) 140 are remote devices that request and receive service from a centralized server, i.e., the system 130. In some other embodiments, the system 130 and the end-point device(s) 140 may have a peer-to-peer relationship in which the system 130 and the end-point device(s) 140 are considered equal and all have the same abilities to use the resources available on the network 110. Instead of having a central server (e.g., system 130) which would act as the shared drive, each device that is connect to the network 110 would act as the server for the files stored on it. In some embodiments, the system 130 may provide an application programming interface ("API") layer for communicating with the end-point device(s) 140.

The system 130 may represent various forms of servers, such as web servers, database servers, file server, or the like, various forms of digital computing devices, such as laptops, desktops, video recorders, audio/video players, radios, workstations, or the like, or any other auxiliary network devices, such as wearable devices, Internet-of-things devices, electronic kiosk devices, mainframes, or the like, or any combination of the aforementioned.

The end-point device(s) 140 may represent various forms of electronic devices, including user input devices such as servers, networked storage drives, personal digital assistants, cellular telephones, smartphones, laptops, desktops, and/or the like, merchant input devices such as point-of-sale (POS) devices, electronic payment kiosks, and/or the like, electronic telecommunications device (e.g., automated teller machine (ATM)), and/or edge devices such as routers, routing switches, integrated access devices (IAD), and/or the like.

The network 110 may be a distributed network that is spread over different networks. This provides a single data communication network, which can be managed jointly or separately by each network. Besides shared communication within the network, the distributed network often also supports distributed processing. The network 110 may be a form of digital communication network such as a telecommunication network, a local area network ("LAN"), a wide area network ("WAN"), a global area network ("GAN"), the Internet, or any combination of the foregoing. The network 110 may be secure and/or unsecure and may also include wireless and/or wired and/or optical interconnection technology.

It is to be understood that the structure of the distributed computing environment and its components, connections and relationships, and their functions, are meant to be exemplary only, and are not meant to limit implementations of the inventions described and/or claimed in this document. In one example, the distributed computing environment 100 may include more, fewer, or different components. In another example, some or all of the portions of the distributed computing environment 100 may be combined into a single portion or all of the portions of the system 130 may be separated into two or more distinct portions.

FIG. 1B illustrates an exemplary component-level structure of the system 130, in accordance with an embodiment of the invention. As shown in FIG. 1B, the system 130 may include a processor 102, memory 104, input/output (I/O) device 116, and a storage device 110. The system 130 may also include a high-speed interface 108 connecting to the memory 104, and a low-speed interface 112 connecting to low speed bus 114 and storage device 110. Each of the components 102, 104, 108, 110, and 112 may be operatively coupled to one another using various buses and may be mounted on a common motherboard or in other manners as appropriate. As described herein, the processor 102 may include a number of subsystems to execute the portions of processes described herein. Each subsystem may be a self-contained component of a larger system (e.g., system 130) and capable of being configured to execute specialized processes as part of the larger system.

The processor 102 can process instructions, such as instructions of an application that may perform the functions disclosed herein. These instructions may be stored in the memory 104 (e.g., non-transitory storage device) or on the storage device 110, for execution within the system 130 using any subsystems described herein. It is to be understood that the system 130 may use, as appropriate, multiple processors, along with multiple memories, and/or I/O devices, to execute the processes described herein.

The memory 104 stores information within the system 130. In one implementation, the memory 104 is a volatile memory unit or units, such as volatile random access memory (RAM) having a cache area for the temporary storage of information, such as a command, a current operating state of the distributed computing environment 100, an intended operating state of the distributed computing environment 100, instructions related to various methods and/or functionalities described herein, and/or the like. In another implementation, the memory 104 is a non-volatile memory unit or units. The memory 104 may also be another form of computer-readable medium, such as a magnetic or optical disk, which may be embedded and/or may be removable. The non-volatile memory may additionally or alternatively include an EEPROM, flash memory, and/or the like for storage of information such as instructions and/or data that may be read during execution of computer instructions. The memory 104 may store, recall, receive, transmit, and/or access various files and/or information used by the system 130 during operation.

The storage device 106 is capable of providing mass storage for the system 130. In one aspect, the storage device 106 may be or contain a computer-readable medium, such as a floppy disk device, a hard disk device, an optical disk device, or a tape device, a flash memory or other similar solid state memory device, or an array of devices, including devices in a storage area network or other configurations. A computer program product can be tangibly embodied in an information carrier. The computer program product may also contain instructions that, when executed, perform one or more methods, such as those described above. The information carrier may be a non-transitory computer- or machine-readable storage medium, such as the memory 104, the storage device 104, or memory on processor 102.

The high-speed interface 108 manages bandwidth-intensive operations for the system 130, while the low speed controller 112 manages lower bandwidth-intensive operations. Such allocation of functions is exemplary only. In some embodiments, the high-speed interface 108 is coupled to memory 104, input/output (I/O) device 116 (e.g., through a graphics processor or accelerator), and to high-speed expansion ports 111, which may accept various expansion cards (not shown). In such an implementation, low-speed controller 112 is coupled to storage device 106 and low-speed expansion port 114. The low-speed expansion port 114, which may include various communication ports (e.g., USB, Bluetooth, Ethernet, wireless Ethernet), may be coupled to one or more input/output devices, such as a keyboard, a pointing device, a scanner, or a networking device such as a switch or router, e.g., through a network adapter.

The system 130 may be implemented in a number of different forms. For example, it may be implemented as a standard server, or multiple times in a group of such servers. Additionally, the system 130 may also be implemented as part of a rack server system or a personal computer such as a laptop computer. Alternatively, components from system 130 may be combined with one or more other same or similar systems and an entire system 130 may be made up of multiple computing devices communicating with each other.

FIG. 1C illustrates an exemplary component-level structure of the end-point device(s) 140, in accordance with an embodiment of the invention. As shown in FIG. 1C, the end-point device(s) 140 includes a processor 152, memory 154, an input/output device such as a display 156, a communication interface 158, and a transceiver 160, among other components. The end-point device(s) 140 may also be provided with a storage device, such as a microdrive or other device, to provide additional storage. Each of the components 152, 154, 158, and 160, are interconnected using various buses, and several of the components may be mounted on a common motherboard or in other manners as appropriate.

The processor 152 is configured to execute instructions within the end-point device(s) 140, including instructions stored in the memory 154, which in one embodiment includes the instructions of an application that may perform the functions disclosed herein, including certain logic, data processing, and data storing functions. The processor may be implemented as a chipset of chips that include separate and multiple analog and digital processors. The processor may be configured to provide, for example, for coordination of the other components of the end-point device(s) 140, such as control of user interfaces, applications run by end-point device(s) 140, and wireless communication by end-point device(s) 140.

The processor 152 may be configured to communicate with the user through control interface 164 and display interface 166 coupled to a display 156. The display 156 may be, for example, a TFT LCD (Thin-Film-Transistor Liquid Crystal Display) or an OLED (Organic Light Emitting Diode) display, or other appropriate display technology. The display interface 156 may comprise appropriate circuitry and configured for driving the display 156 to present graphical and other information to a user. The control interface 164 may receive commands from a user and convert them for submission to the processor 152. In addition, an external interface 168 may be provided in communication with processor 152, so as to enable near area communication of end-point device(s) 140 with other devices. External interface 168 may provide, for example, for wired communication in some implementations, or for wireless communication in other implementations, and multiple interfaces may also be used.

The memory 154 stores information within the end-point device(s) 140. The memory 154 can be implemented as one or more of a computer-readable medium or media, a volatile memory unit or units, or a non-volatile memory unit or units. Expansion memory may also be provided and connected to end-point device(s) 140 through an expansion interface (not shown), which may include, for example, a SIMM (Single In Line Memory Module) card interface. Such expansion memory may provide extra storage space for end-point device(s) 140 or may also store applications or other information therein. In some embodiments, expansion memory may include instructions to carry out or supplement the processes described above and may include secure information also. For example, expansion memory may be provided as a security module for end-point device(s) 140 and may be programmed with instructions that permit secure use of end-point device(s) 140. In addition, secure applications may be provided via the SIMM cards, along with additional information, such as placing identifying information on the SIMM card in a non-hackable manner.

The memory 154 may include, for example, flash memory and/or NVRAM memory. In one aspect, a computer program product is tangibly embodied in an information carrier. The computer program product contains instructions that, when executed, perform one or more methods, such as those described herein. The information carrier is a computer- or machine-readable medium, such as the memory 154, expansion memory, memory on processor 152, or a propagated signal that may be received, for example, over transceiver 160 or external interface 168.

In some embodiments, the user may use the end-point device(s) 140 to transmit and/or receive information or commands to and from the system 130 via the network 110. Any communication between the system 130 and the end-point device(s) 140 may be subject to an authentication protocol allowing the system 130 to maintain security by permitting only authenticated users (or processes) to access the protected resources of the system 130, which may include servers, databases, applications, and/or any of the components described herein. To this end, the system 130 may trigger an authentication subsystem that may require the user (or process) to provide authentication credentials to determine whether the user (or process) is eligible to access the protected resources. Once the authentication credentials are validated and the user (or process) is authenticated, the authentication subsystem may provide the user (or process) with permissioned access to the protected resources. Similarly, the end-point device(s) 140 may provide the system 130 (or other client devices) permissioned access to the protected resources of the end-point device(s) 140, which may include a GPS device, an image capturing component (e.g., camera), a microphone, and/or a speaker.

The end-point device(s) 140 may communicate with the system 130 through communication interface 158, which may include digital signal processing circuitry where necessary. Communication interface 158 may provide for communications under various modes or protocols, such as the Internet Protocol (IP) suite (commonly known as TCP/IP). Protocols in the IP suite define end-to-end data handling methods for everything from packetizing, addressing and routing, to receiving. Broken down into layers, the IP suite includes the link layer, containing communication methods for data that remains within a single network segment (link); the Internet layer, providing internetworking between independent networks; the transport layer, handling host-to-host communication; and the application layer, providing process-to-process data exchange for applications. Each layer contains a stack of protocols used for communications. In addition, the communication interface 158 may provide for communications under various telecommunications standards (2G, 3G, 4G, 5G, and/or the like) using their respective layered protocol stacks. These communications may occur through a transceiver 160, such as radio-frequency transceiver. In addition, short-range communication may occur, such as using a Bluetooth, Wi-Fi, or other such transceiver (not shown). In addition, GPS (Global Positioning System) receiver module 170 may provide additional navigation- and location-related wireless data to end-point device(s) 140, which may be used as appropriate by applications running thereon, and in some embodiments, one or more applications operating on the system 130.

The end-point device(s) 140 may also communicate audibly using audio codec 162, which may receive spoken information from a user and convert it to usable digital information. Audio codec 162 may likewise generate audible sound for a user, such as through a speaker, e.g., in a handset of end-point device(s) 140. Such sound may include sound from voice telephone calls, may include recorded sound (e.g., voice messages, music files, etc.) and may also include sound generated by one or more applications operating on the end-point device(s) 140, and in some embodiments, one or more applications operating on the system 130.

Various implementations of the distributed computing environment 100, including the system 130 and end-point device(s) 140, and techniques described here can be realized in digital electronic circuitry, integrated circuitry, specially designed ASICs (application specific integrated circuits), computer hardware, firmware, software, and/or combinations thereof.

FIG. 2 illustrates an exemplary machine learning (ML) subsystem architecture 200, in accordance with an embodiment of the invention. The machine learning subsystem 200 may include a data acquisition engine 202, data ingestion engine 210, data pre-processing engine 216, ML model tuning engine 222, and inference engine 236.

The data acquisition engine 202 may identify various internal and/or external data sources to generate, test, and/or integrate new features for training the machine learning model 224. These internal and/or external data sources 204, 206, and 208 may be initial locations where the data originates or where physical information is first digitized. The data acquisition engine 202 may identify the location of the data and describe connection characteristics for access and retrieval of data. In some embodiments, data is transported from each data source 204, 206, or 208 using any applicable network protocols, such as the File Transfer Protocol (FTP), Hyper-Text Transfer Protocol (HTTP), or any of the myriad Application Programming Interfaces (APIs) provided by websites, networked applications, and other services. In some embodiments, the these data sources 204, 206, and 208 may include Enterprise Resource Planning (ERP) databases that host data related to day-to-day business activities such as accounting, procurement, project management, exposure management, supply chain operations, and/or the like, mainframe that is often the entity's central data processing center, edge devices that may be any piece of hardware, such as sensors, actuators, gadgets, appliances, or machines, that are programmed for certain applications and can transmit data over the internet or other networks, and/or the like. The data acquired by the data acquisition engine 202 from these data sources 204, 206, and 208 may then be transported to the data ingestion engine 210 for further processing.

Depending on the nature of the data imported from the data acquisition engine 202, the data ingestion engine 210 may move the data to a destination for storage or further analysis. Typically, the data imported from the data acquisition engine 202 may be in varying formats as they come from different sources, including RDBMS, other types of databases, S3 buckets, CSVs, or from streams. Since the data comes from different places, it needs to be cleansed and transformed so that it can be analyzed together with data from other sources. At the data ingestion engine 202, the data may be ingested in real-time, using the stream processing engine 212, in batches using the batch data warehouse 214, or a combination of both. The stream processing engine 212 may be used to process continuous data stream (e.g., data from edge devices), i.e., computing on data directly as it is received, and filter the incoming data to retain specific portions that are deemed useful by aggregating, analyzing, transforming, and ingesting the data. On the other hand, the batch data warehouse 214 collects and transfers data in batches according to scheduled intervals, trigger events, or any other logical ordering.

In machine learning, the quality of data and the useful information that can be derived therefrom directly affects the ability of the machine learning model 224 to learn. The data pre-processing engine 216 may implement advanced integration and processing steps needed to prepare the data for machine learning execution. This may include modules to perform any upfront, data transformation to consolidate the data into alternate forms by changing the value, structure, or format of the data using generalization, normalization, attribute selection, and aggregation, data cleaning by filling missing values, smoothing the noisy data, resolving the inconsistency, and removing outliers, and/or any other encoding steps as needed.

In addition to improving the quality of the data, the data pre-processing engine 216 may implement feature extraction and/or selection techniques to generate training data 218. Feature extraction and/or selection is a process of dimensionality reduction by which an initial set of data is reduced to more manageable groups for processing. A characteristic of these large data sets is a large number of variables that require a lot of computing resources to process. Feature extraction and/or selection may be used to select and/or combine variables into features, effectively reducing the amount of data that must be processed, while still accurately and completely describing the original data set. Depending on the type of machine learning algorithm being used, this training data 218 may require further enrichment. For example, in supervised learning, the training data is enriched using one or more meaningful and informative labels to provide context so a machine learning model can learn from it. For example, labels might indicate whether a photo contains a bird or car, which words were uttered in an audio recording, or if an x-ray contains a tumor. Data labeling is required for a variety of use cases including computer vision, natural language processing, and speech recognition. In contrast, unsupervised learning uses unlabeled data to find patterns in the data, such as inferences or clustering of data points.

The ML model tuning engine 222 may be used to train a machine learning model 224 using the training data 218 to make predictions or decisions without explicitly being programmed to do so. The machine learning model 224 represents what was learned by the selected machine learning algorithm 220 and represents the rules, numbers, and any other algorithm-specific data structures required for classification. Selecting the right machine learning algorithm may depend on a number of different factors, such as the problem statement and the kind of output needed, type and size of the data, the available computational time, number of features and observations in the data, and/or the like. Machine learning algorithms may refer to programs (math and logic) that are configured to self-adjust and perform better as they are exposed to more data. To this extent, machine learning algorithms are capable of adjusting their own parameters, given feedback on previous performance in making predictions about a dataset.

The machine learning algorithms contemplated, described, and/or used herein include supervised learning (e.g., using logistic regression, using back propagation neural networks, using random forests, decision trees, etc.), unsupervised learning (e.g., using an Apriori algorithm, using K-means clustering), semi-supervised learning, reinforcement learning (e.g., using a Q-learning algorithm, using temporal difference learning), and/or any other suitable machine learning model type. Each of these types of machine learning algorithms can implement any of one or more of a regression algorithm (e.g., ordinary least squares, logistic regression, stepwise regression, multivariate adaptive regression splines, locally estimated scatterplot smoothing, etc.), an instance-based method (e.g., k-nearest neighbor, learning vector quantization, self-organizing map, etc.), a regularization method (e.g., ridge regression, least absolute shrinkage and selection operator, elastic net, etc.), a decision tree learning method (e.g., classification and regression tree, iterative dichotomiser 3, C4.5, chi-squared automatic interaction detection, decision stump, random forest, multivariate adaptive regression splines, gradient boosting machines, etc.), a Bayesian method (e.g., naïve Bayes, averaged one-dependence estimators, Bayesian belief network, etc.), a kernel method (e.g., a support vector machine, a radial basis function, etc.), a clustering method (e.g., k-means clustering, expectation maximization, etc.), an associated rule learning algorithm (e.g., an Apriori algorithm, an Eclat algorithm, etc.), an artificial neural network model (e.g., a Perceptron method, a back-propagation method, a Hopfield network method, a self-organizing map method, a learning vector quantization method, etc.), a deep learning algorithm (e.g., a restricted Boltzmann machine, a deep belief network method, a convolution network method, a stacked autoencoder method, etc.), a dimensionality reduction method (e.g., principal component analysis, partial least squares regression, Sammon mapping, multidimensional scaling, projection pursuit, etc.), an ensemble method (e.g., boosting, bootstrapped aggregation, AdaBoost, stacked generalization, gradient boosting machine method, random forest method, etc.), and/or the like.

To tune the machine learning model, the ML model tuning engine 222 may repeatedly execute cycles of experimentation 226, testing 228, and tuning 230 to optimize the performance of the machine learning algorithm 220 and refine the results in preparation for deployment of those results for consumption or decision making. To this end, the ML model tuning engine 222 may dynamically vary hyperparameters each iteration (e.g., number of trees in a tree-based algorithm or the value of alpha in a linear algorithm), run the algorithm on the data again, then compare its performance on a validation set to determine which set of hyperparameters results in the most accurate model. The accuracy of the model is the measurement used to determine which set of hyperparameters is best at identifying relationships and patterns between variables in a dataset based on the input, or training data 218. A fully trained machine learning model 232 is one whose hyperparameters are tuned and model accuracy maximized.

The trained machine learning model 232, similar to any other software application output, can be persisted to storage, file, memory, or application, or looped back into the processing component to be reprocessed. More often, the trained machine learning model 232 is deployed into an existing production environment to make practical business decisions based on live data 234. To this end, the machine learning subsystem 200 uses the inference engine 236 to make such decisions. The type of decision-making may depend upon the type of machine learning algorithm used. For example, machine learning models trained using supervised learning algorithms may be used to structure computations in terms of categorized outputs (e.g., $C\_1, C\_2 \ldots C\_n$ 238) or observations based on defined classifications, represent possible solutions to a decision based on certain conditions, model complex relationships between inputs and outputs to find patterns in data or capture a statistical structure among variables with unknown relationships, and/or the like. On the other hand, machine learning models trained using unsupervised learning algorithms may be used to group (e.g., $C\_1, C\_2 \ldots C\_n$ 238) live data 234 based on how similar they are to one another to solve exploratory challenges where little is known about the data, provide a description or label (e.g., $C\_1, C\_2 \ldots C\_n$ 238) to live data 234, such as in classification, and/or the like. These categorized outputs, groups (clusters), or labels are then presented to the user input system 130. In still other cases, machine learning models that perform regression techniques may use live data 234 to predict or forecast continuous outcomes.

It will be understood that the embodiment of the machine learning subsystem 200 illustrated in FIG. 2 is exemplary and that other embodiments may vary. As another example, in some embodiments, the machine learning subsystem 200 may include more, fewer, or different components.

FIG. 3 illustrates a method 300 for automated intelligent testing of desktop applications through machine learning, in accordance with an embodiment of the disclosure. As shown in block 302, the method includes initiating a testing process for a target computing application by receiving, using a process automation module, input testing data from one or more upstream computing systems. The process automation module may comprise one or more process automation bots that may be configured to test one or more functions of the target application. Accordingly, the system may spool up the one or more process automation bots as needed depending on the number of various functions of the target application that require testing. For instance, in some embodiments, the system may designate one process automation bot per function to be tested.

In some embodiments, certain functions of the target application may receive input data and produce a certain output based on the input data. In an exemplary embodiment, a function may receive the input data and perform a series of computations on the input data to produce the output data (e.g., a function that computes the growth of a resource over a given period of time based on a growth rate). In such embodiments, the input data may be pulled by the process automation module from a variety of data sources. For example, the process automation module may access one or more upstream computing systems and scrape the relevant input data from one or more data files. The various data files may include data files of varying formats, such as document files, spreadsheet files, database files, text files, markup language files, and/or the like. Accordingly, in some embodiments, retrieving the input data may be a part of an input data preprocessing step that may extract the relevant input data and transforms the input data into a format that may be recognized and used to perform the various functions of the target application that are the subject of the testing process.

Next, as shown in block 304, the method includes executing a first function of the target application based on the input testing data to produce a real-time data output. In this regard, the one or more process automation bots of the process automation module may perform one or more actions associated with executing the first function. The one or more actions may include interacting with the target application at the GUI level. According, the one or more actions may include providing mouse or touch inputs, key or text inputs, switching frames or windows, dragging and/or dropping elements into an interface window, navigating screens or popups, interacting with user interface elements (e.g., menu options, activatable buttons, and/or the like), activating shortcuts, and/or the like. For example, activating the first function may in some embodiments include activating a drop down menu, selecting an option within the drop down menu, selecting the relevant input data for the function, and interacting with an interface element to execute the first function (e.g., activating a button labeled "start"). The target application may, in response to receiving the inputs from the process automation module, generate the real-time data output, which reflects the live outputs of the current build of the target application being tested.

Next, as shown in block 306, the method includes generating, using a predicted data output generator, a predicted data output based on historical data associated with the first function, which may in some embodiments be executed in parallel to steps 302 and 304. In this regard, the system may continuously store the historical data regarding testing results from the various target applications along with their respective functions. Accordingly, the historical data associated with the first function may include previous input data used to test the first function along with the real-time outputs produced by the first functions in response to the input data. The predicted data output generator may be an AI-based engine that use a machine learning model (e.g., a GAN) that may be trained using the historical data related to the target application and its functions. In this way, once the predicted data output generator receives input data (which may in some embodiments be the same input data ingested by the process automation module), the predicted data output generator may use the machine learning model to generate the predicted data output, which may in turn be based on historical data output values generated by the first function of the target application.

Next, as shown in block 308, the method includes computing, using a decisioning engine, a delta value between the real-time data output and the predicted data output. The decisioning engine may receive the real-time data output from the process automation module and the predicted data output from the predicted data output generator. Accordingly, the decisioning engine may compare the real-time data output and the predicted data output to determine whether there are any differences between the two outputs, where such differences may indicate the degree to which the predicted data output is mismatched with the real-time data output. The decisioning engine may further, in cases in which a difference exists, quantify the difference between the real-time data output and the predicted data output. To this end, the delta value may be a quantifiable or numeric value that may be computed based on the difference between the real-time data output and the predicted data output.

Next, as shown in block 310, the method includes determining whether the delta value is within a threshold associated with the first function. The threshold associated with the first function may be determined at least in part based on the historical data associated with the first function (e.g., data inputs and/or data outputs associated with the first function). In this regard, in some embodiments, the system may use machine learning to continuously adjust the value of the threshold over time based on the collected historical data. The threshold may be determined by the system based on whether the observed data output values fall within a certain expected range or expected format. For example, the historical data may indicate that the output values given a certain input have a normal variance of 0.23. Accordingly, the threshold associated with the output values may be set to or about 0.23 for the function given a particular input value. Based on whether the difference between the real-time data output and the predicted data output falls within the designated threshold, the system may determine whether the testing of the function was a success (e.g., the real-time data output is within the expected threshold from the predicted data output) or a failure (e.g., the real-time data output deviates beyond the expected threshold from the predicted data output). In this way, the system may distinguish between true testing errors or failures from false testing errors or failures.

If the system determines that the delta value is within the threshold, as shown in block 312, the method includes determining that testing of the first function has succeeded. In determining that the delta value is within the threshold, the system may determine that the real-time data output falls within the historical data output values associated with the first function. In this regard, such a delta value may be considered to be attributable to reasons other than a failure of the first function of the target application (e.g., code optimizations of the first function, changes to reference data used by the first function, and/or the like). Upon determining that the testing of the first function has succeeded, the system may further flag the testing process to have succeeded for the given input data values and output data values. In turn, the system may also generate a data record of the success of the testing process with respect to the first function. The data record may comprise the input data used to perform the testing, the real-time data output as well as the predicted data outputs, the calculated delta between the real-time data output and the predicted data output, a timestamp for completion of the testing process, and an indication that the testing of the first function has succeeded (e.g., that the delta between the real-time data output and the predicted data output falls within the threshold associated with the first function). The data record may then be appended to the historical data, which in turn may be used to drive the machine learning models as described elsewhere herein.

If the system determines that the delta value is not within the threshold, as shown in block 314, the method includes determining that testing of the first function has failed. In this regard, the system may determine that the real-time data output falls outside of the historical data output values associated with the first function. In some embodiments, this may occur when the real-time data output is in an unexpected format from the predicted data output. For example, the expected output format of the first function may be a percentage value (e.g., a value from 0 to 1). If the real-time data output is a value greater than 1 or a negative number, the system may determine that the real-time data output falls outside of the threshold for the first function and thereby determine that the delta value is attributable to a failure or error of the first function of the target application. The system may further generate a data record of the failure with respect to the first function, where the data record may include information such as the input data used to perform the testing, the real-time data output as well as the predicted data outputs, the calculated delta between the real-time data output and the predicted data output, a timestamp for completion of the testing process, and an indication that the testing of the first function has failed (e.g., that the delta between the real-time data output and the predicted data output falls outside of the threshold associated with the first function).

Next, as shown in block 316, the method includes backpropagating testing results from the decisioning engine to the predicted data output generator. In this regard, the data record indicating that the testing process has either succeeded or failed may be saved into the historical data used by the predicted data output generator and/or the decisioning engine. In turn, the machine learning models associated with the predicted data output generator and/or the decisioning engine may further be trained using the data records generated as a result of the testing process. Based on the new data records, the machine learning models may adjust the predictive models for generating the predicted data output (e.g., by adjusting internal decisioning weights of the machine learning algorithm). Accordingly, the accuracy of the predicted data outputs generated by the predicted data output generator may increase over time, which in turn reduces the number of false failures found during the testing process (e.g., by generating predicted data outputs that closely match the real-time data outputs). In this way, the system provides an end-to-end automated testing solution for various computing applications.

As will be appreciated by one of ordinary skill in the art, the present disclosure may be embodied as an apparatus (including, for example, a system, a machine, a device, a computer program product, and/or the like), as a method (including, for example, a business process, a computer-implemented process, and/or the like), as a computer program product (including firmware, resident software, microcode, and the like), or as any combination of the foregoing. Many modifications and other embodiments of the present disclosure set forth herein will come to mind to one skilled in the art to which these embodiments pertain having the benefit of the teachings presented in the foregoing descriptions and the associated drawings. Although the figures only show certain components of the methods and systems described herein, it is understood that various other components may also be part of the disclosures herein. In addition, the method described above may include fewer steps in some cases, while in other cases may include additional steps. Modifications to the steps of the method described above, in some cases, may be performed in any order and in any combination.

Therefore, it is to be understood that the present disclosure is not to be limited to the specific embodiments disclosed and that modifications and other embodiments are intended to be included within the scope of the appended claims. Although specific terms are employed herein, they are used in a generic and descriptive sense only and not for purposes of limitation.

What is claimed is:

1. A system for automated intelligent testing of desktop applications through machine learning, the system comprising:
    a processing device;
    a non-transitory storage device containing instructions when executed by the processing device, causes the processing device to perform the steps of:
        initiating a testing process for a target computing application by receiving, using a process automation module, input testing data from one or more upstream computing systems;
        executing a first function of the target computing application based on the input testing data to produce a real-time data output;
        receiving, from a user computing device, an event data record comprising event-related data associated with a resource;
        generating, using a predicted data output generator, a predicted data output based on historical data associated with the first function;
        computing, using a decisioning engine, a delta value between the real-time data output and the predicted data output;
        determining whether the delta value is within a threshold associated with the first function; and
        backpropagating results of the testing process to the predicted data output generator.

2. The system of claim 1, wherein determining whether the delta value is within a threshold associated with the first function comprises:
    determining that the delta value is within the threshold associated with the first function; and
    based on determining that the delta value is within the threshold associated with the first function, determining that the testing process has succeeded with respect to the first function.

3. The system of claim 2, wherein backpropagating the results of the testing process comprises generating a data record indicating that the testing process has succeeded, wherein the data record comprises the input testing data, the real-time data output, the predicted data output, the delta value between the real-time data output and the predicted data output, and a timestamp of completion of the testing process.

4. The system of claim 1, wherein determining whether the delta value is within a threshold associated with the first function comprises:
    determining that the delta value is outside of the threshold associated with the first function; and
    based on determining that the delta value is outside of the threshold associated with the first function, determining that the testing process has failed with respect to the first function.

5. The system of claim 4, wherein backpropagating the results of the testing process comprises generating a data record indicating that the testing process has failed, wherein the data record comprises the input testing data, the real-time data output, the predicted data output, the delta value between the real-time data output and the predicted data output, and a timestamp of completion of the testing process.

6. The system of claim 1, wherein the threshold associated with the first function is determined based on historical data regarding historical input testing data values and historical data output values.

7. The system of claim 1, wherein the predicted data output generator uses a machine-learning model to generate the predicted data output.

8. A computer program product for automated intelligent testing of desktop applications through machine learning, the computer program product comprising a non-transitory computer-readable medium comprising code causing an apparatus to perform the steps of:
 initiating a testing process for a target computing application by receiving, using a process automation module, input testing data from one or more upstream computing systems;
 executing a first function of the target computing application based on the input testing data to produce a real-time data output;
 receiving, from a user computing device, an event data record comprising event-related data associated with a resource;
 generating, using a predicted data output generator, a predicted data output based on historical data associated with the first function;
 computing, using a decisioning engine, a delta value between the real-time data output and the predicted data output;
 determining whether the delta value is within a threshold associated with the first function; and
 backpropagating results of the testing process to the predicted data output generator.

9. The computer program product of claim 8, wherein determining whether the delta value is within a threshold associated with the first function comprises:
 determining that the delta value is within the threshold associated with the first function; and
 based on determining that the delta value is within the threshold associated with the first function, determining that the testing process has succeeded with respect to the first function.

10. The computer program product of claim 9, wherein backpropagating the results of the testing process comprises generating a data record indicating that the testing process has succeeded, wherein the data record comprises the input testing data, the real-time data output, the predicted data output, the delta value between the real-time data output and the predicted data output, and a timestamp of completion of the testing process.

11. The computer program product of claim 8, wherein determining whether the delta value is within a threshold associated with the first function comprises:
 determining that the delta value is outside of the threshold associated with the first function; and
 based on determining that the delta value is outside of the threshold associated with the first function, determining that the testing process has failed with respect to the first function.

12. The computer program product of claim 11, wherein backpropagating the results of the testing process comprises generating a data record indicating that the testing process has failed, wherein the data record comprises the input testing data, the real-time data output, the predicted data output, the delta value between the real-time data output and the predicted data output, and a timestamp of completion of the testing process.

13. The computer program product of claim 8, wherein the threshold associated with the first function is determined based on historical data regarding historical input testing data values and historical data output values.

14. A computer-implemented method for automated intelligent testing of desktop applications through machine learning, the computer-implemented method comprising:
 initiating a testing process for a target computing application by receiving, using a process automation module, input testing data from one or more upstream computing systems;
 executing a first function of the target computing application based on the input testing data to produce a real-time data output;
 receiving, from a user computing device, an event data record comprising event-related data associated with a resource;
 generating, using a predicted data output generator, a predicted data output based on historical data associated with the first function;
 computing, using a decisioning engine, a delta value between the real-time data output and the predicted data output;
 determining whether the delta value is within a threshold associated with the first function; and
 backpropagating results of the testing process to the predicted data output generator.

15. The computer-implemented method of claim 14, wherein determining whether the delta value is within a threshold associated with the first function comprises:
 determining that the delta value is within the threshold associated with the first function; and
 based on determining that the delta value is within the threshold associated with the first function, determining that the testing process has succeeded with respect to the first function.

16. The computer-implemented method of claim 15, wherein backpropagating the results of the testing process comprises generating a data record indicating that the testing process has succeeded, wherein the data record comprises the input testing data, the real-time data output, the predicted data output, the delta value between the real-time data output and the predicted data output, and a timestamp of completion of the testing process.

17. The computer-implemented method of claim 14, wherein determining whether the delta value is within a threshold associated with the first function comprises:
 determining that the delta value is outside of the threshold associated with the first function; and
 based on determining that the delta value is outside of the threshold associated with the first function, determining that the testing process has failed with respect to the first function.

18. The computer-implemented method of claim 17, wherein backpropagating the results of the testing process comprises generating a data record indicating that the testing process has failed, wherein the data record comprises the input testing data, the real-time data output, the predicted data output, the delta value between the real-time data output and the predicted data output, and a timestamp of completion of the testing process.

19. The computer-implemented method of claim 14, wherein the threshold associated with the first function is determined based on historical data regarding historical input testing data values and historical data output values.

20. The computer-implemented method of claim 14, wherein the predicted data output generator uses a machine-learning model to generate the predicted data output.

* * * * *